UNITED STATES PATENT OFFICE.

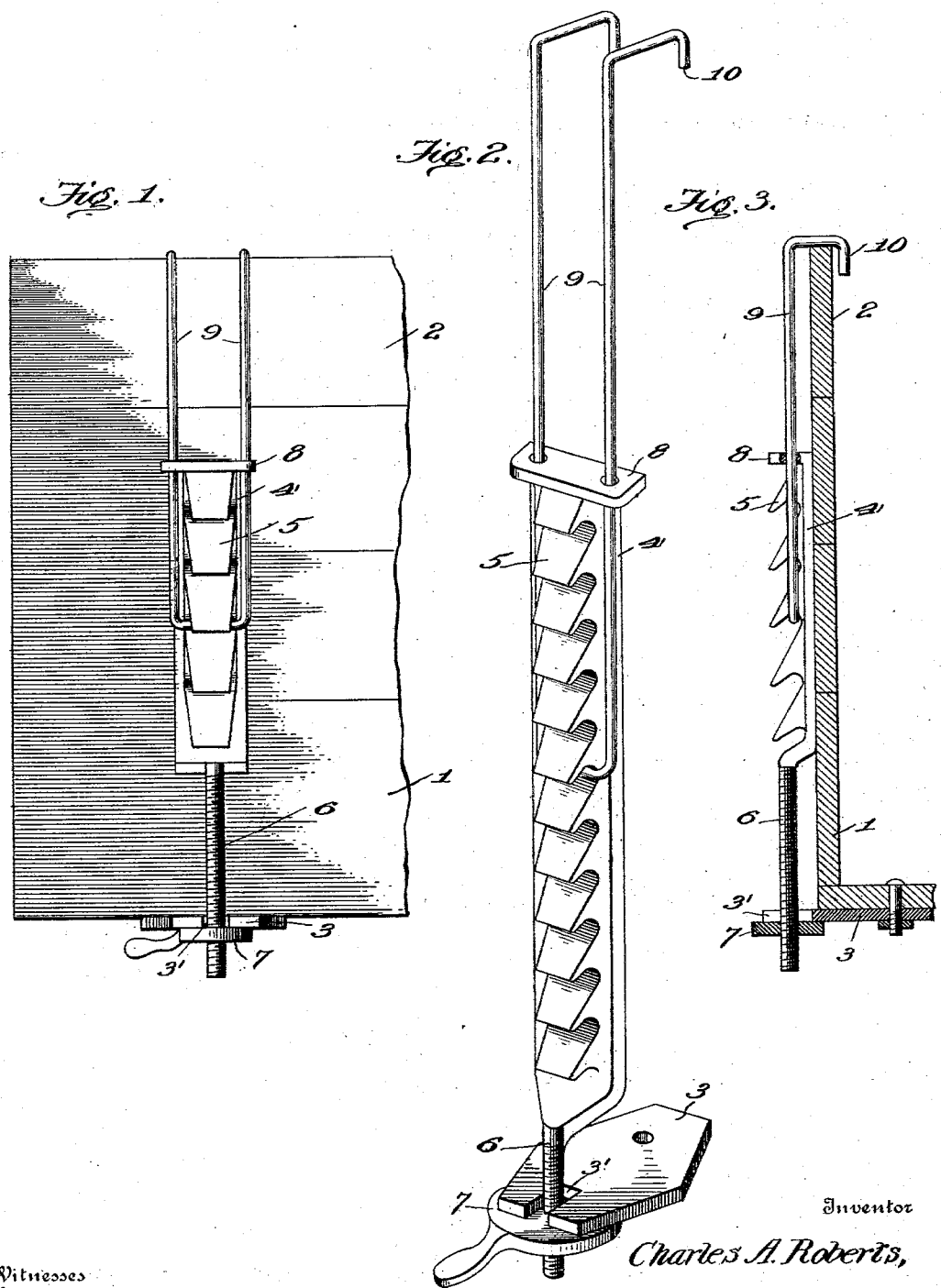

CHARLES A. ROBERTS, OF RENSSELAER, INDIANA.

TOP-BOX FASTENER FOR WAGON-BODIES.

SPECIFICATION forming part of Letters Patent No. 704,926, dated July 15, 1902.

Application filed March 31, 1902. Serial No. 100,781. (No model.)

*To all whom it may concern:*

Be it known that I, CHARLES A. ROBERTS, a citizen of the United States, residing at Rensselaer, in the county of Jasper and State of Indiana, have invented certain new and useful Improvements in Top-Box Fasteners for Wagon-Bodies; and I do declare the following to be a full, clear, and exact description of the invention, such as will enable others skilled in the art to which it appertains to make and use the same.

This invention relates to means for fastening top-boxes to wagon-bodies; and its object is to provide a fastening device which is effective at all times and will securely hold one or more top boxes firmly in place upon the body.

A further object is to provide a device of this character which shall form a permanent fixture of the body and is not liable to become lost or misplaced, as is the case when fastenings of the ordinary type are used.

With these and other objects in view the invention consists of certain novel features of construction, combination, and arrangement of parts, which will be hereinafter more fully described, and particularly pointed out in the appended claim.

In the accompanying drawings, Figure 1 is a side elevation of a portion of a wagon-body, showing the top boxes connected thereto by my invention. Fig. 3 is a cross-section of the same, and Fig. 2 is a perspective view of the parts of the fastener.

Referring now more particularly to the drawings, the numeral 1 designates a wagon-body of any ordinary or preferred construction, and 2 represents one or more top boxes resting thereon. Bolted or otherwise secured to the bottom of the body is a bracket-plate 3, which has one end projecting beyond the side of the body and bifurcated to form a slot 3'.

The fastening devices comprise a bar 4, which is notched or otherwise suitably constructed to provide a longitudinal series of rack-teeth 5 upon its outer face and is formed at its lower end with a stem 6, which is threaded to receive a tail-nut or adjusting-nut 7, having a handle by means of which it may be conveniently manipulated. This stem 6 projects down through the slot 3' in the outer end of the bracket and is engaged by the nut 7, which bears against the under side of the bracket, as clearly shown in Fig. 3.

The upper end of the bar 4 is formed with a cross-head 8, having suitable openings, or in lieu thereof with eyes subserving a like purpose, through which openings or eyes slide the opposite side arms of a bail 9, which extends up through the guideway in the bracket and is adjustable on the bar to contract or lengthen the fastener to suit different depths of top boxes or to secure one or more top boxes in place upon the body. As shown, the bail is provided at its upper ends with hooks 10 to engage or take over the upper edge of the uppermost top box, and its lower end or return bent portion is adapted to engage the teeth of the bar 4, by means of which the bail is locked to firmly secure the top boxes in place. The teeth 5 are shown as being undercut for inclining downwardly, so as to form recessed bearing portions and inclined backs, said backs allowing of a ready downward adjustment of the bail and the recesses serving to receive the return portion thereof to hold said bail securely in engagement with the teeth, thereby preventing casual displacement thereof.

In operation after the top box or boxes have been placed in position upon the wagon-body the bail is released from engagement with the rack-bar and adjusted upwardly through the eyes or openings in the cross-bar until the hooks are brought into position to engage the upper edge of the upper top box, when the bail is moved downwardly to interlock with the upper tooth to give it a preliminary adjustment by which the top box will be held in place and then the tail-nut 7 is adjusted to draw down upon the stem 6, whereupon both the rack-bar and bail will be adjusted downwardly to clamp the top box or boxes more firmly in place, so as to form practically a solid body. When it is desired to release the top boxes or either one of them, the nut 7 is loosened up, so as to allow the bail to be disengaged from the tooth with which it is connected on the rack-bar, thus allowing it to be adjusted upwardly, so as to bring the hooked ends thereof out of engagement with the edge of the top box, leaving the latter free to be disconnected. The brackets 3 form permanent fixtures on the body 1, so that when the top boxes are removed the bail and rack-bar will be held in position, so that they can be used whenever required.

By employing the construction of fastener herein described the device is always in place for connecting one or more top boxes to the body and at the same time the parts are secured upon the body in such a manner that they cannot become accidentally disengaged or lost, as is the case when thumb-screws and other like devices are employed for accomplishing the same purpose.

It will of course be understood that the fastenings may be applied on each side of the body at the front and rear ends thereof, so as to clamp the boxes at each corner or that they may be otherwise applied and any desired number used to hold the top box or boxes firmly in position. When it is desired to remove the fastener, however, this may be conveniently accomplished by simply slackening the nut 7, elevating the bail 9, and drawing the stem 6 outward through the slot 3'.

From the foregoing description, taken in connection with the accompanying drawings, it is thought that the construction, mode of operation, and advantages of the invention will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a fastener for connecting the body and top box of a wagon, the combination with a wagon-body and box resting thereon, of a bracket-plate secured to the under side of the wagon-body and having a projecting end bifurcated to form an open slot, a rack-bar extending vertically alongside the wagon-body and box and provided at its upper end with eyes and at its lower end with a threaded stem fitting in said slot, said stem being removable from the slot by a movement outwardly from the wagon-body, an adjusting-nut engaging the stem and bridging the slot and bearing against the under side of the bracket-plate, and a U-shaped bail sliding through the eyes and having its return portion adapted to engage the teeth on the rack-bar and having its arms provided at their free ends with hooks to take over the edge of the top box, whereby, upon elevating the bail and slackening the nut, the stem may be slid outward from the slot and the fastener removed, substantially as and for the purpose set forth.

In testimony whereof I have hereunto set my hand in presence of two subscribing witnesses.

CHAS. A. ROBERTS.

Witnesses:
BLANCHE HOYES,
CHARLES G. SPITLER.